Patented Apr. 9, 1935

1,996,757

UNITED STATES PATENT OFFICE 1,996,757

PROCESS OF PREPARING MOLDED ARTICLES

Ernst Elbel, Erkner, near Berlin, Germany, assignor to Bakelite Gesellschaft mit Beschrankter Haftung, Berlin, Germany No Drawing. Application December 10, 1931, Serial No. 580,225. In Germany December 15, 1930

3 Claims. (Cl. 106—22)

For the industrial manufacture of the most varied molded pieces, for example for purposes of electrical engineering and thermo-dynamics, for the radio industry and every day use mixtures of hardenable synthetic resins and fillers are employed. These mixtures are so prepared that the filler is mixed by a suitable process with the resin serving as a binder, and the further manufacture into molded articles is done by a molding process under simultaneous or subsequent action of heat. The following materials are used as fillers: ground cellulose, cotton, absorbent cotton, fibers or minerals, such as asbestos and the like, if necessary mixed with dyes, plasticizers and the like. Such molded pieces may thereby be made which, although mechanically and physically very resistant, are comparatively easily corroded by chemical substances, such as acids, and are not absolutely water-resistant. This is a surprising disadvantage, as the hardened synthetic resins prepared without fillers in thin or thick layers are as a rule resistant to most any chemical action.

It has been found that this insufficient chemical resistance of the articles made in the specific manner from hardenable synthetic resins and fillers is caused by the fillers, because as a rule they retain a certain absorptive capacity in spite of a comparatively good impregnation with the hardened synthetic resin and thereby enable acid or the like to penetrate into the molded piece.

It has been found that the lack of sufficient water and acid resistance may be alleviated if the fillers, ground or powdered, are mixed, impregnated or treated otherwise with the synthetic resins so that a very homogeneous and even product is formed from fillers and synthetic resins this product to be hardened in the heat with or without the application of pressure, then to be crushed and after adding thereto again liquid, solid or dissolved hardenable synthetic resin binders working the resulting product to molding mixtures or molded articles. The mixture obtained from the hardened resin-filler-product and the hardenable resinous binder added thereto is then molded in the usual manner and hardened by simultaneous or subsequent application of heat. In the first treatment of the crude fillers with the synthetic resins the conditions for the treatment (type and distribution of the fillers, type of synthetic resins, time required, pressure and temperature of the treatment, etc.) must be so chosen that the fillers and synthetic resins form a very even and homogeneous product. This can be realized, for example, by grinding in a known manner the crude fillers with the hardenable resins, treating the resulting mixture on heated mixing rolls and crushing the product obtained on the rollers. In the second treatment with synthetic resins the remaining absorbent fibres or other fillers are evidently coated or lacquered with a layer of synthetic resin. The resulting product then is molded by the simultaneous or subsequent action of heat and when hardened yields molded pieces which are essentially more resistant to water as well as acid than the articles made from fillers and hardenable resinous binders by the known methods.

*Example 1.*—6 kilos of wood flour are mixed, for example in a ball mill, with 6 kilos of a crushed hardenable phenolformaldehyde resin in the A-state until a homogeneous mixture is obtained. The resulting mixture is placed on heated mixing rolls having a temperature of about 100° C. The resin contained in this mixture melts on said rollers and penetrates into the wood flour particles which are impregnated therewith. A sheet is obtained on the rollers which is stripped off and pulverized. The resulting powder is heated for about 2 hours or more to about 150° C. Owing to this heat-treatment which, as mentioned above, may be carried out for 2 hours or more, and in which pressure may also be applied, the phenolformaldehyde resin contained in said mixture passes to the C-state. The mixture may also be hardened at higher or lower temperatures than 150° C., the period of time employed being chosen shorter or longer accordingly.

The hardened mixture is then mixed with a pulverized hardenable phenolformaldehyde resin in the A-state, in a proportion of 10–100 percent by weight to the hardened mixture. The resin is homogeneously mixed with the hardened mixture, for example in a ball mill or in another mixing device, and the resulting product is placed on heated mixing rolls and treated thereon in a similar way as described above. Thereby a continuous sheet is again obtained which is taken off the rollers and crushed. The resulting crushed product which contains the resinous binder in a still sufficiently plastic hardenable state, is ready for use and can be worked according to the known processes to molded articles, for example by cold-molding and subsequent hardening, or by hot-molding by simultaneous application of pressure and heat.

*Example 2.*—10 kilos of a solution consisting of 2 kilos of alcohol and 8 kilos of a phenolformaldehyde resin in the A-state are treated with 8 kilos of finely comminuted paper in a kneading apparatus until a homogeneous mixture and the complete impregnation of the paper particles is obtained. The mixture is then extended on screens, removing the alcohol by heating in a vacuo or by heating at normal pressure. The temperature is then raised to about 130° C. and the impregnated paper composition is heated at such temperature until the resin contained in the fibre has been transformed into the C-state. This process requires for example 1½ hours or more. The heating process may also be carried out at a lower or a higher temperature, the period of hardening required being correspondingly longer or shorter. It is of course also possible to effect the heating at a raised pressure. The hardened mixture is ground and rolled on hot rollers together with 6 kilos of a pulverized phenolformaldehyde resin in the A-state. For this purpose for example rollers are used having a temperature of about 100° C. enabling the pulverized mixture to form a continuous sheet due to the fused phenolformaldehyde resin. When treating the mixture on rollers it must be borne in mind that an injurious hardening of resin must be avoided in order to maintain the plasticity of the mixture. The sheet formed is then taken off the rollers, being crushed thereafter and molded articles being made therefrom according to the cold-molding or hot-molding process.

Suitable hardenable synthetic resins for carrying out the present invention are especially the well known hardenable resins from phenols and aldehydes; however, one may also use in their place other hardenable synthetic resins, for example, the resin-like condensation products from urea and aldehydes, polybasic acids and polyalcohols, etc. To carry out the present process, all hardenable synthetic resins are suitable if mixed for example with wood flour, mica, organic or inorganic fibrous substances, abrasive grains or the like, dyes, plasticizers, or other additions. As a rule the hardenable resins in A condition are used for the treatment of the filters; one may, however, also use B resins, preferably in solution. By hardenable resins, as used in the present application, I understand also compositions of non-hardenable resins and hardening agents and also compositions of the resins with plasticizing agents and dyestuffs or other known additions.

I claim:

1. Process of preparing a molded article from an absorptive filler and a heat-hardening resinous binder, characterized by improved resistance to absorption of water and acids which comprises mixing the filler with a heat-hardening resin in a fusible soluble condition, then treating so as to cause impregnation of absorptive filler by the resin until a homogeneous composition is obtained, hardening the composition by heating, comminuting the hardened composition, forming a moldable composition therefrom by adding a heat-hardening resinous binder, and molding the composition so produced to shape by the application of pressure and heat.

2. Process of preparing a moldable composition from a heat-hardening synthetic resin binder and an absorptive filler characterized when molded into an article by improved resistance to absorption of water and acids, which comprises mixing the filler with a heat-hardening resin in a fusible, soluble condition, then treating so as to cause impregnation of the absorptive filler by the resin until a homogeneous composition is obtained, hardening the composition by heating, comminuting the hardened composition, and forming a moldable composition therefrom by adding a heat-hardening resinous binder.

3. Moldable composition comprising a heat-hardening resinous binder and a filler in comminuted form of a heat-hardened homogeneous composition of an absorptive filler impregnated by a synthetic resin of the heat-hardening type as produced by the process of claim 2, said composition yielding when molded an article of improved resistance to absorption of water and acids.

ERNST ELBEL.